United States Patent [19]

Phipps

[11] 4,325,564
[45] Apr. 20, 1982

[54] BICYCLE TRAILER

[76] Inventor: Roger N. Phipps, Star Route, Box 3215, Wasilla, Ak. 99687

[21] Appl. No.: 134,540

[22] Filed: Mar. 27, 1980

[51] Int. Cl.³ .............................................. B62D 63/08
[52] U.S. Cl. ..................................... 280/204; 280/78; 280/492
[58] Field of Search ................. 280/204, 292, 492, 78, 280/47.32

[56] References Cited

U.S. PATENT DOCUMENTS

| | | | |
|---|---|---|---|
| 2,706,055 | 4/1955 | Nichols | 280/492 X |
| 3,387,859 | 6/1968 | McClellan | 280/78 X |
| 3,456,959 | 7/1969 | Hemphill et al. | 280/47.3 |
| 3,937,489 | 2/1976 | Hawes | 280/204 |

FOREIGN PATENT DOCUMENTS

| | | | |
|---|---|---|---|
| 794900 | 2/1936 | France | 280/204 |
| 947103 | 6/1949 | France | 280/204 |
| 868120 | 2/1953 | Fed. Rep. of Germany | 280/204 |
| 492503 | 3/1954 | Italy | 280/204 |

*Primary Examiner*—John A. Pekar
*Attorney, Agent, or Firm*—Robert M. Hessin

[57] ABSTRACT

A bicycle trailer having reduced transverse profile and horizontal frame work with load carriage concentrated over the trailer wheel. The device utilizes a horizontal frame work as fork-supported above a standard bicycle wheel and having a tongue assembly formed integral with the trailer frame. The tongue assembly is then pivotally attached over a hitch plate that is vertically pivotally attached via T-connectors to each rear fork member of the associated bicycle.

5 Claims, 7 Drawing Figures

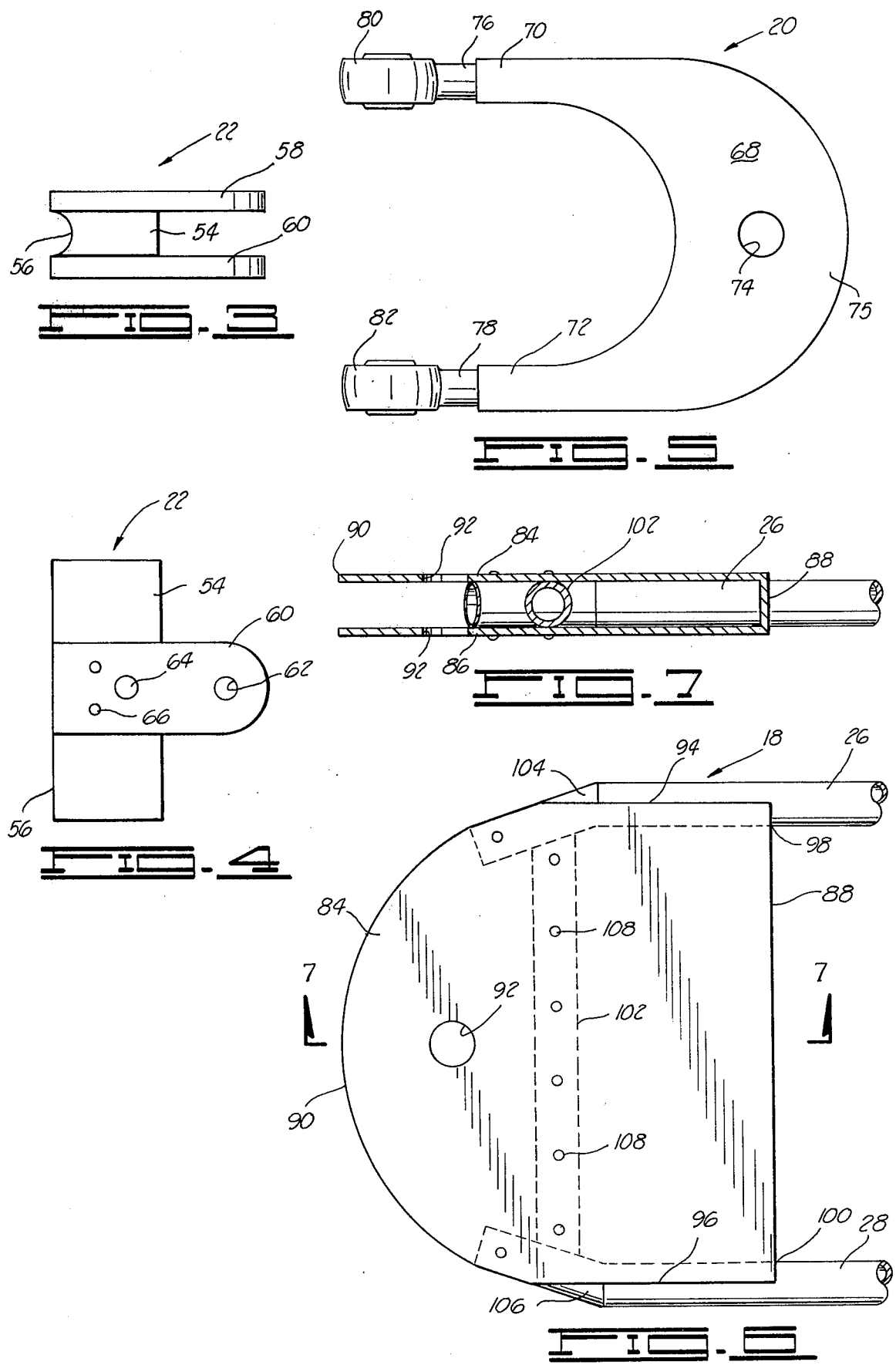

BICYCLE TRAILER

BACKGROUND OF THE INVENTION

1. Field of the Invention

The invention relates generally to bicycle trailers and, more particularly, but not by way of limitation, it relates to an improved construction of bicycle trailer having lighter weight and greater tracking ability.

2. Description of the Prior Art

The prior art includes numerous types of bicycle trailers that have been used in the past for carrying various types of loads. United States patents known to be of particular interest are U.S. Pat. Nos. 2,404,362; 660,598; and 624,678. These prior art trailer types teach an entirely different form of frame structure and wheeling arrangements of distinguishable nature from the disclosure set forth hereinafter.

SUMMARY OF THE INVENTION

The present invention relates to improvements in construction of bicycle trailers which enables provision of a standardized hitch and trailer assembly that may be utilized with any of today's touring-type bicycles as well as most other types of bicycles. The hitch assembly is vertically pivotally mounted to the rear forks of the bicycle for pivotal affixure with a tongue assembly as secured to an elongated trailer frame. The elongated trailer frame is supported in the horizontal attitude by suitable trailer fork members and braces which, in turn, are supported rotatably on a standard sized bicycle wheel.

Therefore, it is an object of the present invention to provide a bicycle trailer which is light weight and durable of construction.

It is also an object of the present invention to provide an improved bicycle trailer having superior tracking capability to alleviate any dragging forces imposed on the bicycle.

Finally, it is an object of the present invention to provide a trailer that concentrates load weight on the trailer wheel and which requires no modification for use on all touring bicycles.

Other objects and advantages will be evident from the following detailed description when read in conjunction with the accompanying drawings which illustrate the invention.

BRIEF DESCRIPTION OF THE DRAWINGS

FIG. 3 is a top plan view of a hitch T-connector as constructed in accordance with the present invention;

FIG. 4 is a side view of the T-connector of FIG. 3;

FIG. 5 is a top plan view of the hitch plate of the present invention;

FIG. 6 is a top plan view of the tongue assembly of the present invention; and,

FIG. 7 is a section taken along lines 7—7 of FIG. 6.

DETAILED DESCRIPTION OF THE INVENTION

Figure 1:
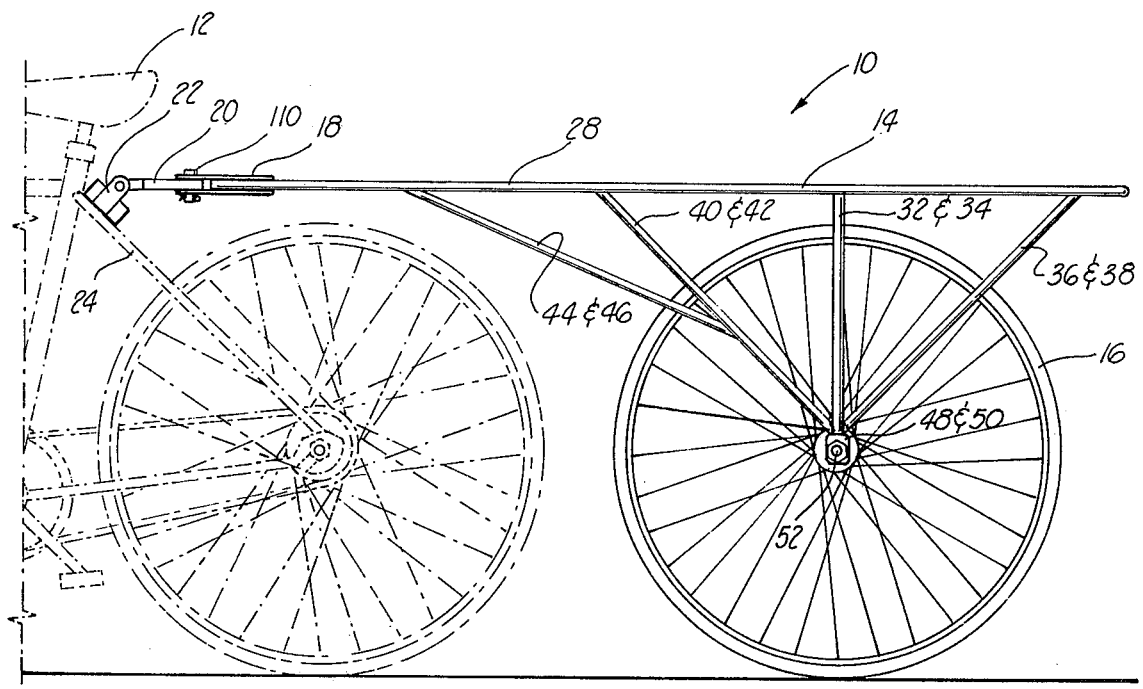
FIG. 1 is a side elevation of the bicycle trailer and hitch assembly.
Figure 2:
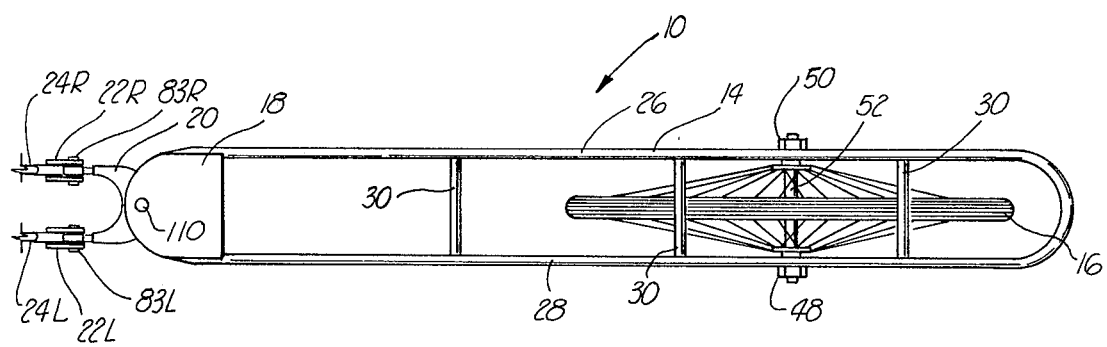
FIG. 2 is a top view of the bicycle trailer and hitch assembly.

With reference to FIGS. 1 and 2, the bicycle trailer 10 is pivotally secured for rear towing from a standard bicycle 12. The trailer 10 includes a horizontal, elongated frame 14 as supported on a standard bicycle wheel 16, and towing affixure is carried out by a tongue assembly 18 and hitch assembly 20 as vertically, pivotally secured to first and second T-connectors 22. The T-connectors 22 are suitably secured to the bicycle rear fork members 24 by such as tubing clamps, welding, etc.

The support frame 14 may be formed from a single piece of steel or aluminum tubing to form parallel side rails 26 and 28 which are secured to opposite sides of tongue assembly 18, as will be further described. Suitable tubing cross pieces 30 are secured as by welding between side rails 26 and 28 to provide lateral rigidity. The load frame 14 is then supported by a bifurcated support structure including fork members 32 and 34, rear brace members 36 and 38, front brace members 40 and 42 and long braces 44 and 46. The opposed side fork members and brace members are secured as by welding to the underside of respective frame rails 26 and 28 wherein they terminate as secured at fork flanges 48 and 50 wherein an axle 52 of support wheel 16 is rotatably received. The long braces 44 and 46 are secured as by welding from respective front braces 40 and 42 to be secured beneath the forward portion of side rails 28 and 26.

Each of the left and right T-connectors 22 are formed identically as illustrated in FIGS. 3 and 4. Thus, a central bar 54 is formed with one long edge having a half-round hollowed edge 56 for abutment against the bicycle fork members. A pair of identical flange plates 58, 60 having a securing eye 62 are then rigidly fastened centrally on opposite sides of bar 54 thereby to provide connector brackets for receiving the hitch assembly 20. The T-connectors 22 may be unitarily formed, or they may be formed utilizing one-half inch by 1¼ inch metal bar stock for the bar 54 and ¼ inch by 1 inch metal bar stock for the flange plates 58 and 60 with suitable securing by means of pins 64, 66. The half-round edge 56 of T-connector 22 is then placed in abutment to the bicycle rear fork member for clamping, and it is preferred that a padded hose-type clamp be utilized on each end of bar 54, thereby avoiding any marring or permanent disfiguration of the bicycle finish.

FIG. 5 illustrates the hitch assembly 20 which is formed as a bifurcated hitch plate 58 having arms 70 and 72 and a hitch hole 74 formed centrally of the plate portion 68. The fork arm ends 70 and 72 are each tapped to receive the threaded rod ends 76 and 78 of the bearing rod ends 80 and 82, respectively. The threaded shaft bearing rod ends 80 and 82 are a commercially available type, AN 946-RE3MR3-"Self Aligning Ball Bearing Rod Ends". Each of the bearing rod ends 80 and 82 is then adapted for insertion between flange plates 58 and 60 of each of respective T-connectors 22L and 22R where a suitable fastener connection can be inserted, e.g. clevis pins 83 of other type rotatable fasteners.

FIGS. 6 and 7 illustrate the tongue assembly 18 as it is formed on the forward end of frame side rails 26 and 28. Upper and lower tongue plates 84 and 86 are formed, preferably from a single piece of folded metal, and to include a lateral edge plate 88 which serves to provide additional transverse stiffening. The upper and lower tongue plate 84 and 86 are each formed with a semicircular end portion 90 having a hitch receiving hole 92 formed generally centrally in the semicircular end portion 90 of the plates. The side rail frames 26 and 28 are then secured as by welding along opposite sides 94 and 96. Semicircular cut out portions 98 and 100 in the back plate 88 will enable the side frames 26 and 28 to be led in for suitable securing affixure between tongue plates 84 and 86. The sides 94 and 96 of the tongue plate may be welded to side rails 26, 28 and a length of tubing 102 and angle tubes 104 and 106 are further secured between tongue plates 84 and 86 by means of spot welds 108, or like fastening techniques. The upper and lower tongue plates 84 and 86 are then adapted to be received above and below the spade portion 74 of hitch plate 58 with insertaion of a clevis pin 110 or like rotatable fastener through holes 92 and 74 to maintain the trailer 10 in proper tracking and trailing position.

In operation, the T-connectors 22 are suitably secured to opposite rear fork members 24 and the bearing rod ends 80 and 82 are then pin-secured by means of pins 83 within the respective T-connectors 22L and 22R. The eye inserts of bearings 80 and 82 are capable of limited swivelling to enable easy alignment of the receiving holes and pin fasteners. Thereafter, the trailer 10 may be moved to slide tongue plates 84 and 86 over the hinge plate 68, and alignment of hinge hole 74 with tongue hole 92 enables insertion of the hitch pin 110, a suitable clevis pin or like arrangement.

The bicycle 12 and trailer 10 are then in operative coupling for travel as the traveller's gear is affixed on horizontal frame 14. The biker may utilize various types of carriers such as standard bicycle panniers, saddle bags, wire side baskets and the like. In addition, larger items such as tents and sleeping bags may be easily secured on top of frame 14 by the use of shock cords or similar tying equipment. In any event, the carriage load may be centered directly over the trailer wheel 16 in such concentration as advantageous, and the trailer 10 will track in draft of the bicycle with least resistance to the biker's motivation efforts.

The foregoing discloses a positive tracking bicycle trailer that exhibits considerable advantage over prior art forms of device. The trailer is optimally adjusted as to height and linearity to provide best center of gravity connection to the towing bicycle, and the trailer load is concentrated wholly on the trailer wheel without placing downward forces on the rear wheel of the bicycle. The particular structure contemplated allows use of high quality, light weight, efficient components having sufficient rugged characteristic for the particular usage. In addition, the trailer assembly has reduced frontal area to lessen wind resistance while also maintaining a lighter overall frame weight. The bicycle trailer of the present invention requires no modification to the towing bicycle and is readily usable on all 26 or 27 inch bicycles, i.e. the touring type bicycles.

Changes may be made in combination and arrangement of elements as heretofore set forth in the specification and shown in the drawings; it being understood that changes may be made in the embodiment disclosed without departing from the spirit and scope of the invention as defined in the following claims.

What is claimed is:

1. Apparatus for trailing behind a standard bicycle having a pair of opposite rear fork members, comprising:

first and second connector means each secured to a respective one of said opposite rear fork members;

hitch assembly means consisting of bifurcated plate means having a hitch support portion and laterally spaced hitch arms;

a first bearing rod having the rod end secured to one of said hitch arms and having the bearing end vertically pivotally secured to said first connector means;

a second bearing rod having the rod end secured to the opposite hitch arm and the bearing end vertically pivotally secured to said second connector means;

elongated, horizontal frame means having forward and and rearward ends;

fork support means secured beneath said frame means;

a bicycle wheel and axle rotatably secured between said fork support means;

tongue plate means integrally formed with the forward end of said frame means; and pin securing means for pivotally affixing said tongue plate means over said hitch assembly means hitch support portion.

2. Apparatus as set forth in claim 1 wherein said frame means comprises:

tubular metal forming spaced parallel side rails that are laterally separated by approximately the length of the bicycle wheel axle.

3. Apparatus as set forth in claim 1 wherein said tongue plate means comprises:

upper and lower tongue plates secured to said forward end of said frame means, said tongue plates being secured in parallel and spaced for sliding reception over said hitch assembly means.

4. Apparatus as set forth in claim 1 wherein said fork support means comprises:

opposite side fork members secured to extend perpendicularly downward from the opposite sides of said frame means to terminate in an axle receiving flange; and forward and rear angle braces disposed on each side at approximately forty-five degrees as secured between said frame means and said receiving flanges.

5. Apparatus as set forth in claim 1 wherein:

the horizontal contact area of said hitch support portion and said tongue plates has a lateral dimension on the order of half the width of the frame means thereby to provide additional vertical stability.

* * * * *